(12) United States Patent
Kladitis et al.

(10) Patent No.: US 10,570,541 B2
(45) Date of Patent: Feb. 25, 2020

(54) CARBON NANOTUBE THREAD Z-AXIS MULTIFUNCTIONAL STITCHING

(71) Applicants: University of Dayton, Dayton, OH (US); Nanocomp Technologies Inc., The Woodlands, TX (US)

(72) Inventors: Paul Kladitis, Clayton, OH (US); Lingchuan Li, Dayton, OH (US); Brian Rice, Mason, OH (US); Zongwu Bai, Beavercreek, OH (US); David Gailus, Merrimack, NH (US)

(73) Assignees: University of Dayton, Dayton, OH (US); Nanocomp Technologies, Inc., The Woodlands, TX (US)

( * ) Notice: Subject to any disclaimer, the term of this patent is extended or adjusted under 35 U.S.C. 154(b) by 119 days.

(21) Appl. No.: 15/636,075

(22) Filed: Jun. 28, 2017

(65) Prior Publication Data
US 2017/0370039 A1    Dec. 28, 2017

Related U.S. Application Data

(60) Provisional application No. 62/355,569, filed on Jun. 28, 2016.

(51) Int. Cl.
| | |
|---|---|
| C01B 32/158 | (2017.01) |
| D05B 93/00 | (2006.01) |
| C01B 32/168 | (2017.01) |
| D01F 9/12 | (2006.01) |
| D05B 43/00 | (2006.01) |

(Continued)

(52) U.S. Cl.
CPC .............. D05B 93/00 (2013.01); B05C 3/125 (2013.01); C01B 32/168 (2017.08); D01F 9/12 (2013.01); D05B 43/00 (2013.01); B82Y 30/00 (2013.01); B82Y 40/00 (2013.01); Y10S 977/745 (2013.01);

(Continued)

(58) Field of Classification Search
CPC ... C01B 32/158; C01B 32/168; C01B 32/174; D05B 93/00; D01F 9/12
See application file for complete search history.

(56) References Cited

U.S. PATENT DOCUMENTS

2002/0185770 A1* 12/2002 McKague ............... B29C 70/14
                                                                        264/108
2004/0053780 A1*  3/2004 Jiang ........................ B01J 23/74
                                                                        502/182

(Continued)

*Primary Examiner* — Ellen M McAvoy

(57) ABSTRACT

Carbon nanotube threads are coated with a coating solution such as dimethylformamide (DMF), ethylene glycol (EG), polyethylene glycol (PEG), PEG200 (PEG with an average molecular weight of approximately 200 grams per mole (g/mol)), PEG400 (PEG with an average molecular weight of approximately 400 g/mol), aminopropyl terminated polydimethylsiloxane (DMS 100 cP),polyimide, poly(methylhydrosiloxane), polyalkylene glycol, (3-aminopropyl) trimethoxysilane, hydride functional siloxane O resin, platinum (0) -1,3-divinyl-1,1,3,3-tetramethyl-disiloxane, moisture in air, acetic acid, water, poly(dimethylsiloxane) hydroxy terminated, (3-glycidyloxypropyl)-trimethoxysilane or a combination thereof. The coated carbon nanotubes may be used to stitch in a Z-direction into a composite such as a polymer prepreg to strengthen the composite. The stitching may occur using a sewing machine.

20 Claims, 1 Drawing Sheet

| ID | Ingredients | Designed bonding at fiber/sizing interface | Designed sections for lubrication | Designed functional groups for composite matrix compatibility | Notes |
|---|---|---|---|---|---|
| Sizing PHPM | Poly(methylhydrosiloxane); Platinum (0) -1,3-divinyl-1,1,3,3-tetramethyl-disiloxane; Moisture in air | CNT-O-Si- ; CNT-C-O-Si- | Siloxane | Hydroxyl | |
| Sizing PHGM | Polyalkylene glycol; Poly(methylhydrosiloxane); (3-Aminopropyl)trimethoxysilane; Platinum (0) -1,3-divinyl-1,1,3,3-tetramethyl-disiloxane | CNT-O-Si- ; CNT-C-O-Si- | PAG; Siloxane | Hydroxyl & amine | Two-step sizing |
| Sizing AMSG | Polyalkylene glycol; (3-Glycidyloxypropyl)trimethoxysilane; Hydride functional siloxane O resin; Platinum (0) -1,3-divinyl-1,1,3,3-tetramethyl-disiloxane | CNT-O-Si- ; CNT-C-O-Si- | PAG; Siloxane | Hydroxyl & epoxide | Two-step sizing |
| Sizing PPHAP | Polyalkylene glycol; Poly(methylhydrosiloxane); 3-Glycidyloxypropyl)trimethoxysilane; Platinum (0) -1,3-divinyl-1,1,3,3-tetramethyl-disiloxane | CNT-O-Si- ; CNT-C-O-Si- | PAG; Siloxane | Hydroxyl & epoxide | Two-step sizing |
| Sizing PGPMH | Polyalkylene glycol; 3-Glycidyloxypropyl)trimethoxysilane; poly(dimethylsiloxane) hydroxy terminated; Acetic acid; Water | CNT-O-Si- ; CNT-C-O-Si- | PAG; Siloxane | Hydroxyl & epoxide | |
| Sizing PPA | Polyalkylene glycol; poly(dimethylsiloxane) hydroxy terminated; (3-Aminopropyl)trimethoxysilane | CNT-O-Si- ; CNT-C-O-Si- | PAG; Siloxane | Hydroxyl & amine | Two-step sizing |

(51) Int. Cl.
  *B05C 3/12* (2006.01)
  *B82Y 40/00* (2011.01)
  *B82Y 30/00* (2011.01)
(52) U.S. Cl.
  CPC ........ *Y10S 977/847* (2013.01); *Y10S 977/961* (2013.01)

(56) References Cited

U.S. PATENT DOCUMENTS

| | | | |
|---|---|---|---|
| 2008/0286564 A1* | 11/2008 | Tsotsis | B29C 70/025 428/332 |
| 2009/0282802 A1* | 11/2009 | Cooper | D02G 3/16 57/238 |
| 2011/0036828 A1* | 2/2011 | Feng | H05B 3/342 219/529 |
| 2012/0295406 A1* | 11/2012 | Numata | B82Y 10/00 438/158 |
| 2013/0251619 A1* | 9/2013 | Rikihisa | B82Y 30/00 423/447.2 |
| 2013/0316172 A1* | 11/2013 | Shanov | B82Y 30/00 428/367 |
| 2013/0327262 A1* | 12/2013 | Shim | B32B 7/08 112/475.17 |
| 2015/0298164 A1* | 10/2015 | Pasquali | B82Y 30/00 428/161 |
| 2016/0118157 A1* | 4/2016 | Holesinger | B21C 1/02 428/366 |
| 2017/0243668 A1* | 8/2017 | Pasquali | H01B 1/04 |
| 2018/0002179 A1* | 1/2018 | Okamoto | B82Y 30/00 |

* cited by examiner

| ID | Ingredients | Designed bonding at fiber/sizing interface | Designed sections for lubrication | Designed functional groups for composite matrix compatibility | Notes |
|---|---|---|---|---|---|
| Sizing PHPM | Poly(methylhydrosiloxane); Platinum (0) -1,3-divinyl-1,1,3,3-tetramethyl-disiloxane; Moisture in air | CNT-O-Si-  ;  CNT-C-O-Si- (O=) | Siloxane | Hydroxyl | |
| Sizing PHGM | Polyalkylene glycol; Poly(methylhydrosiloxane); (3-Aminopropyl)trimethoxysilane; Platinum (0) -1,3-divinyl-1,1,3,3-tetramethyl-disiloxane | CNT-O-Si-  ;  CNT-C-O-Si- (O=) | PAG; Siloxane | Hydroxyl & amine | Two-step sizing |
| Sizing AMSG | Polyalkylene glycol; (3-Glycidyloxypropyl)trimethoxysilane; Hydride functional siloxane O resin; Platinum (0) -1,3-divinyl-1,1,3,3-tetramethyl-disiloxane | CNT-O-Si-  ;  CNT-C-O-Si- (O=) | PAG; Siloxane | Hydroxyl & epoxide | Two-step sizing |
| Sizing PPHAP | Polyalkylene glycol; Poly(methylhydrosiloxane); 3-Glycidyloxypropyl)trimethoxysilane; Platinum (0) -1,3-divinyl-1,1,3,3-tetramethyl-disiloxane | CNT-O-Si-  ;  CNT-C-O-Si- (O=) | PAG; Siloxane | Hydroxyl & epoxide | Two-step sizing |
| Sizing PGPMH | Polyalkylene glycol; 3-Glycidyloxypropyl)trimethoxysilane; poly(dimethylsiloxane) hydroxy terminated; Acetic acid; Water | CNT-O-Si-  ;  CNT-C-O-Si- (O=) | PAG; Siloxane | Hydroxyl & epoxide | |
| Sizing PPA | Polyalkylene glycol; poly(dimethylsiloxane) hydroxy terminated; (3-Aminopropyl)trimethoxysilane | CNT-O-Si-  ;  CNT-C-O-Si- (O=) | PAG; Siloxane | Hydroxyl & amine | Two-step sizing |

CARBON NANOTUBE THREAD Z-AXIS MULTIFUNCTIONAL STITCHING

CROSS REFERENCES TO RELATED APPLICATIONS

This application claims the benefit of priority under 35 U.S.C. § 119(e) to U.S. Provisional Application Ser. No. 62/355,569, filed Jun. 28, 2016.

STATEMENT REGARDING FEDERALLY SPONSERED RESEARCH OR DEVELOPMENT

This invention was made with government support under a contract awarded by the United States Department of Defense. The government has certain rights in the invention.

TECHNICAL FIELD

Embodiments of the present disclosure generally relate to coatings and applications for carbon nanotube thread.

BACKGROUND

Carbon nanotubes (CNTs) are allotropes of carbon with a cylindrical nanostructure. Nanotubes have been constructed with length-to-diameter ratio of up to 132,000,000:1, significantly larger than for any other material. These cylindrical carbon molecules have unusual properties, which are valuable for nanotechnology, electronics, optics and other fields of materials science and technology. In particular, owing to their extraordinary thermal conductivity and mechanical and electrical properties, carbon nanotubes find applications as additives to various structural materials. For instance, nanotubes form a tiny portion of the material(s) in some (primarily carbon fiber) baseball bats, golf clubs, car parts or Damascus steel.

SUMMARY

Ongoing needs exist to fully realize the capabilities of carbon nanotube (CNT) threads. While carbon nanotubes are used in various applications, CNT threads have limited applicability. Currently, there are limited uses for these articles, which have great potential. By developing different avenues of use, the CNT thread may become the primary structure or components as opposed to a simple additive.

Embodiments of the present disclosure are directed to strengthening composites in the Z-direction at either local areas or through the entire composite structure, thus solving a key weakness in the conventional composite structures. CNT thread Z-stitching also enables multifunctionality in composite structures. This technology is applicable to any and all types of organic matrix composites as well as carbon/carbon composites and ceramic matrix composites.

In one embodiment of this disclosure, an article comprises a substrate and a carbon nanotube (CNT) thread coated with a coating solution to form a coated CNT thread, wherein the coating solution is chosen from dimethylformamide (DMF), ethylene glycol (EG), polyethylene glycol (PEG), PEG200 (PEG with an average molecular weight of approximately 200 grams per mole (g/mol)), PEG400 (PEG with an average molecular weight of approximately 400 g/mol), aminopropyl terminated polydimethylsiloxane (DMS 100 cP), HP1632, poly(methylhydrosiloxane), polyalkylene glycol, (3-aminopropyl)trimethoxysilane, hydride functional siloxane O resin, platinum (0)-1,3-divinyl-1,1,3,3-tetramethyldisiloxane, moisture in air, acetic acid, water, (poly(dimethylsiloxane) hydroxy-terminated, (3-glycidyloxypropyl)trimethoxysilane or a combination thereof, and the coated CNT thread is stitched in a Z-direction of the substrate.

Another embodiment described herein is an article comprising a substrate and a carbon nanotube (CNT) thread coated with a coating solution to form a coated CNT thread, wherein the coated CNT thread is stitched in a Z-direction of the substrate.

This disclosure also describes a method for stitching an article comprising: coating carbon nanotube (CNT) thread with a coating solution to form a coated CNT thread; treating to the coated CNT thread with heat until the coated CNT thread is dry; forming a spool of coated nanotube (CNT) thread; loading the spool of coated CNT thread into a sewing machine; and sewing the coated CNT thread into a substrate.

These and other features, aspects, and advantages of the present invention will become better understood with reference to the following description and the appended claims.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings, in which:

The FIGURE includes synthetic schemes for preparing coated CNT thread according to embodiments described herein.

DETAILED DESCRIPTION

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

As used in this disclosure, the term "preforms" are three-dimensional fabric forms designed to conform to a specific shape to meet specific mechanical and structural requirements. Carbon nanotube (CNT) thread can be sewn in to the Z-direction of a composite preform using a standard sewing machines, industrial sewing machines (one or two-sided), or a LayStich system. CNT thread may be any CNT thread made by any suitable method. Various kinds of CNT thread are available commercially from Nanocomp Technologies, Inc (NTI). The CNT thread may have a single ply or multiple plies and standard production strength or high strength. The CNT thread is electrically conductive.

The Z-direction stitching significantly improves Z-direction mechanical, thermal, and electrical properties. The CNT thread electrical properties may be exploited further by designing stitched patterns and using these as embedded composites as antennas, heaters, sensors, or general wiring for any type of electrical connection for various applications—this concept is referred to as enabling multifunctionality into composite structures.

A LayStitch system allows for novel fiber architectures through the computer controlled deposition of fiber tows and threads in a layer-by-layer process. The CNT thread can be used as either (or both) the sewing thread or the tow material to construct many types of optimized strength or multifunctional composite preforms including all CNT preforms. The CNT yarn enables this type of application, because carbon fiber tows are too brittle to be used as a thread and have a denier that is much too large for many applications.

In the aerospace field, the most common form of composite fabrication is through a lay-up of prepreg plies, which are then cured to form a composite structure. Prepreg plies are used because the toughened matrix resin can be uniformly coated onto each laminate. The prepreg lay-up approach is not suitable to making complex composite parts. Complex parts are easy to make using dry preforms however. Dry preforms require subsequent resin infusion to make a finished composite, and this process may restrict the use of most tougheners used in prepreg systems.

Conventional prepreg-based composite structures can be Z-pinned to improve damage tolerance; however, Z-pinning is expensive and damages the prepreg fibers. With the advent of Z-stitching, high strength CNT threads can be stitched into dry laminates, damage-free, providing superior toughening versus traditional toughened resins in prepregs or Z-pinning. Also the CNT thread can with stand higher temperatures than polymer-based threads enabling use for BMI's polyimides, carbon/carbon, and ceramic matrix composites. Additionally, CNT threads are electrically and thermally conductive thereby enabling various multifunctionalities. Overall, CNT threads Z-stitching enables complex and tougher composite preforms and resulting structures that cannot be fabricated today with state-of-the-art technologies.

Using combinations of solvents and solutions, the CNT thread is coated and then treated. In one embodiment, the coating solution is selected from the Hydrosize® line of products, which includes sizing solutions designed for use in the manufacturing of glass fiber, carbon fiber and natural fiber, using chopped strand or continuous strand fiber glass. These are in turn used to manufacture composite products and components. This solution offers excellent adhesion properties and abrasion resistance. In one embodiment, the solution is HP 1632, which is a polyimide solution.

In another embodiment, the coating solution comprises DMF, ethylene glycol (EG), polyethylene glycol (PEG), PEG200 (PEG with an average molecular weight of approximately 200 grams per mole (g/mol)), PEG400 (PEG with an average molecular weight of approximately 400 g/mol), aminopropyl terminated polydimethylsiloxane (DMS100 cP), HP1632, poly(methylhydrosiloxane), polyalkylene glycol, (3-aminopropyl)trimethoxysilane, hydride functional siloxane O resin, platinum (0) -1,3-divinyl-1,1,3,3-tetramethyl-disiloxane, moisture in air, acetic acid, water, poly (dimethylsiloxane) hydroxy terminated, (3-glycidyloxypropyl)trimethoxysilane or a combination thereof. However, other acids stronger and weaker than acetic acid may be substituted for acetic acid. In addition, other chemicals with similar chemical properties may be substituted for other reagents in the coating solution.

Depending on the type of coating in which a CNT thread is immersed, different treatments yield better or worse results, with the desired result being a lower coefficient of friction. A lower friction coefficient allows the CNT thread to be used in a sewing machine, similar to normal thread, which encompasses winding the thread on a spool, loading the spool into a sewing machine, and sewing the coated CNT thread into a substrate without the thread breaking.

In further embodiments, the coating solution may comprise DMS, AMSG, HPM, or PAWG. DMS is an aminopropyl terminated polydimethylsiloxane and is also a lubricant that has amino group for matrix compatibility. AMSG is a three-ingredient mixture. The AMSG offers amino group for matrix interaction and is believed to generate hydroxyl groups when the coated threads are left in air for sufficient long storage time (by moisture in air). The AMSG interacts with carboxylic and hydroxyl groups of the fiber surface if they are available. The AMSG has polyalkylene glycol and silicone for lubrication. HPM is a two-ingredient mixture that is believed to generate hydroxyl groups when the coated yarns are left in air for sufficient long storage time). The HPM interacts with carboxylic and hydroxyl groups of the fiber surfaces if they are available. The HPM has silicone section for lubrication. PAWG is a three-ingredient mixture. The PAWG offers epoxy groups for matrix interaction and is believed to interact with carboxylic and hydroxyl groups of the fiber surfaces if they are available. The PAWG has polyalkylene glycol for lubrication.

In still further embodiments, the coating solution may include any type of oil such as, for example, petroleum based oils, synthetic oils, and natural oils such as vegetable oil, coconut oil, palm oil, or combinations thereof.

In some embodiments, while the coated nanotube thread is being used to stitch or sew, a solvent such as water, alcohol, or acetone, for example, may be dripped or sprayed onto the carbon nanotube thread. The benefit of using a solvent in this manner is that the solvent can be dried away, leaving no residue after sewing. In some embodiments, dry graphite powder may be used to lubricate the coated carbon nanotube thread during sewing.

The CNT thread is treated by immersing the thread in a coating solution, and then drying the thread. There are different combinations of coating solutions, as previously described. Depending on the coating solution, the immersion and drying steps may be repeated two or three times. Once the thread has been immersed in the coating solution, the CNT thread is heated at a temperature from 50° C. to 230° C.

After the CNT thread is coated, an additional lubricant may increase the functionality of the thread. Siloxane, polyalkylene glycol, or combinations thereof were typical lubricants used for various trials.

EXAMPLES

The following examples are offered by way of illustration only and are not intended to limit the scope of the preceding disclosure or the appended claims.

Tables 1 and 2 include the results of different tests, when CNT thread was immersed in a coating solution and then dried. As the results show, for CNT threads coated with DMF (dimethylformamide) the coefficient of friction was less after treatment than it was before treatment.

The tests included a coefficient of friction (COF) test and a sewing test. A test sample was given a "Pass" in the COF test if either (a) the coefficient of friction of a coated/size carbon nanotube thread was determined to be less than that of a neat (uncoated/unsized) carbon nanotube thread; or (b) the coefficient of friction of the coated/size carbon nanotube thread was determined to be similar to (±10%) that of a regular polyester or cotton sewing thread conventionally used in a sewing machine. A test sample was given a "Pass" in the sewing test if, on loading a spool of the coated carbon nanotube thread into a conventional home sewing machine and using the carbon nanotube thread to sew according to the manufacturer instructions of the conventional home sewing machine, the coated carbon nanotube thread sews properly, i.e., does not tangle, jam the sewing machine, or miss stitches.

Table 2 describes results from applying different treatments and coatings to CNT thread and testing in the same manner as described in Table 1. In trials 4-6, the treatments were repeated, and two after-treatment coefficients of friction are reported: the COF measured before the treatment was repeated (Heat 1), and the COF measured after the second treatment (Heat 2).

In Test 1, the coating solution included a combination of polyalkylene glycol, (3-aminopropyl)trimethoxysilane, hydride functional siloxane O resin, and platinum (0) -1,3-divinyl-1,1,3,3-tetramethyldisiloxane. This coating was chosen to yield an interface comprising the following CNT/sizing interface:

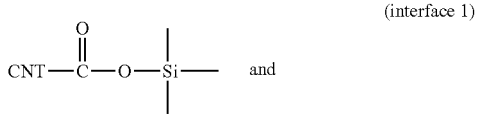

(interface 1)

and

TABLE 1

Solvent Based Investigation

| Coating No | Description | Treatment | Before Treatment COF* | SD** | After Treatment COF | SD | COF Test | Sewing Test |
|---|---|---|---|---|---|---|---|---|
| 1 | DMF | Immersion & 50° C. Dry | 0.264 | 10.11 | 0.254 | 0.018 | Pass | N/T |
| 2 | DMF | Immersion & 160° C. Dry | 0.211 | 0.004 | 0.201 | 0.002 | Pass | N/T |
| 3 | DMF | Immersion & 50° C. Dry | 0.218 | 0.077 | 0.202 | 0.003 | Pass | Pass |
| 4 | DMF/HP1632 (90/10 v/v) | Immersion & 230° C. Dry (x2) | 0.267 | 0.005 | Heat 1 = 0.280 Heat 2 = 0.288 | Heat 1 = 0.280 Heat 2 = 0.288 | Fail | N/T |
| 5 | DMF/HP1632 (75/25 v/v) | Immersion & 230° C. Dry (x2) | 0.252 | 0.033 | Heat 1 = 0.314 Heat 2 = 0.297 | Heat 1 = 0.314 Heat 2 = 0.297 | Fail | N/T |
| 6 | DMF/HP1632 (50/50 v/v) | Immersion & 230° C. Dry (x2) | 0.266 | 0.004 | Heat 1 = 0.327 Heat 2 = 0.323 | Heat 1 = 0.327 Heat 2 = 0.323 | Fail | N/T |

*Coefficient of Friction
**Standard Deviation

TABLE 2

Lubrication Based Investigation

| Coating No | Description | Treatment | Before Treatment COF | SD | After Treatment COF*** | SD | COF Test | Sewing Test |
|---|---|---|---|---|---|---|---|---|
| 1 | DMS100cP | Immersion & 200° C. Dry | 0.203 | 0.012 | 0.199 | 0.018 | Pass | Pass 16 plies of fiberglass |
| 2 | DMS100cP | Immersion & 200° C. Dry | 0.264 | 0.011 | 0.265 | 0.040 | Fail (yarn defects) | N/T |
| 3 | PEG200 | Immersion & 200° C. Dry (x2) | 0.208 | 0.009 | Heat 1 = 0.382 Heat 2 = 0.419 | Heat 1 = 0.160 Heat 2 = 0.202 | Fail | Pass |
| 4 | EG | Immersion & 50° C. Dry | 0.202 | 0.007 | Heat 1 = 0.259 Heat 2 = 0.256 | Heat 1 = 0.029 Heat 2 = 0.030 | Fail | N/T |
| 5 | PEG200 | Immersion & 200° C. Dry (x2) | 0.265 | 0.010 | Heat 1 = 0.358 Heat 2 = 0.244 | Heat 1 = 0.194 Heat 2 = 0.019 | Pass | N/T |
| 6 | PEG400 | Immersion & 200° C. Dry (x2) | 0.203 | 0.012 | Heat 1 = 0.403 Heat 2 = 0.444 | Heat 1 = 0.036 Heat 2 = 0.087 | Fail | N/T |

To assess how certain lubrication components affected the COF, three different tests were performed, the data for which are provided in Table 3. The lubrication test was chosen to assess compatibility with certain other functional groups. In the three tests, three different sizings of CNT thread, three different coatings, two different treatments, and three different lubrication components were used.

-continued (interface 2)

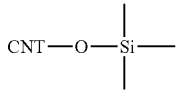

These interface substituent groups created a matrix that was compatible to binding hydroxyl groups and amine groups. The CNT thread source was Lot. #271, 4-ply consisting of sizing AMSG. The CNT thread was coated as described in this paragraph by immersing the thread into the coating solution, then drying the thread at 140° C., and then repeating these two steps (immersing the CNT thread and drying the CNT thread).

In Test 2, the coating solution included hydride-functional siloxane O resin, platinum (0)-1,3-divinyl-1,1,3,3-tetramethyl-disiloxane, and the moisture in air. This coating was chosen to yield interface 1 and interface 2. The designed lubrication component consisted of siloxane. The interface substituent groups and the lubrication component created a matrix that was compatible to binding hydroxyl groups. The CNT thread source was Lot. #271, 4-ply consisting of sizing HPM. The CNT thread was treated by immersing the CNT thread in the coating described in this paragraph, and then drying the CNT thread at 140° C. The immersing and drying steps were only performed once.

In Test 3, the coating solution included a combination of polyalkylene glycol, acetic acid, water, and (3-glycidyloxypropyl)trimethoxysilane. This coating was chosen to yield interface 1 and interface 2. The designed lubrication component consisted of PAG. The interface substituent groups and the lubrication component created a matrix that was compatible to binding hydroxyl groups and epoxide groups. The CNT thread source was Lot. #271, 4-ply consisting of sizing PAWG. The CNT thread was treated by immersing the CNT thread in the coating described in this paragraph, and then drying the CNT thread at 140° C. The immersing and drying steps were only performed once.

The results to the three tests mentioned above are recorded in Table 3. All three strands of CNT thread passed the sewing test.

TABLE 3

| | Custom Synthesis | | | | | |
|---|---|---|---|---|---|---|
| | Before Treatment | | After Treatment | | | |
| No. | COF | SD | COF | SD | COF Test | Sewing Test |
| 1 | 0.227 | 0.003 | 0.207 | 0.012 | Pass | Pass |
| 2 | 0.223 | 0.023 | 0.217 | 0.011 | Pass | Pass |
| 3 | 0.242 | 0.009 | 0.208 | 0.047 | Pass | Pass |

Additional synthetic schemes that may be used in embodiments are provided in the FIGURE.

Various composites were sewn or stitched in the Z-direction with coated carbon nanotube threads according to embodiments of this disclosure. Mechanical testing performed on the stitched composites showed that the Z-stitching improves interlaminar composite properties such as the results of Mode I fracture toughness testing.

For assessing fracture toughness, twelve-ply carbon fiber cloth test specimens with untoughened epoxy SR-4-86 matrices or toughened RM2005 epoxy matrices were fabricated and tested. The results in the Table 4 show that 0.125-inch pitch stitches resulted in a tougher composite than aerospace grade toughened epoxy matrix composites. The results also show that sparser 0.25-inch pitch stitches out performed both untoughened epoxy matrix and nanoparticle enhanced epoxy matrix composites.

Stitched composites were tested for fracture toughness. Results of various tests for fracture toughness are provided in Table 4.

TABLE 4

Results of Mode I Fracture Toughness Testing

| Test Specimen Type | Automated Calculation (lbs/in) | Manual Calculation (lbs/in) |
|---|---|---|
| SR-4-86 0.125-inch Stitched Panel | 7.061 | 7.985 |
| RM2005 Toughened Baseline Panel | 5.468 | 5.895 |
| SR-4-86 0.25-inch Stitched Panel | 4.633 | 5.085 |
| SR-4-86 Untoughened Baseline Panel | 3.550 | 3.856 |
| S4-4-86 Nano-enhanced Panel | 3.416 | 3.846 |

It should be apparent to those skilled in the art that modifications and variations can be made to the embodiments described herein without departing from the spirit and scope of the claimed subject matter. Thus, it is intended that the specification cover the modifications and variations of the various embodiments described herein, provided such modifications and variations come within the scope of the appended claims and their equivalents.

What we claim is:

1. A method for coating a carbon nanotube thread having an initial coefficient of friction, the method comprising:
   immersing a carbon nanotube thread in a coating solution to form a coated carbon nanotube thread, the coating solution being selected from the group consisting of DMF, DMS, AMSG, HPM, PAWG, PHGM, AMSG2, PPHAP, PGPMH, and PPA, where:
   DMF is dimethylformamide;
   DMS is an aminopropyl-terminated polydimethvlsiloxane;
   AMSG is a mixture of polvalkvlene glycol, (3-aminopropvl) trimethoxysilane, hydride-functional siloxane O resin, and platinum (0)-1,3-divinyl-1-1,1,3,3-tetramethyl-disiloxane;
   HPM is a mixture of hydride-functional siloxane O resin and platinum (0 )-1,3-divinyl-1,1,3,3-tetramethyl-disiloxane;
   PAWG is a mixture of polyalkylene glycol, (3-glycidyloxypropyl) trimethoxysilane, acetic acid, and water;
   PHPM is a mixture of polyalkylene glycol, hydride-functional siloxane O resin, and platinum (0 )-1,3-divinyl-1,1,3,3-tetramethyl-disiloxane;
   PHGM is a mixture of polyalkylene glycol, polv(m-ethylhydrosiloxane), (3-aminopropyl)trimethoxysilane, and platinum (0 )-1,3-divinyl-1,1,3,3-tetramethyl-disiloxane;
   AMSG2 is a mixture of polyalkylene glycol, (3-glycidyloxypropyl)trimethoxysilane, hydride-functional siloxane O resin, and platinum (0 -1,3-divinyl-1,1,3,3-tetramethyl-disiloxane:
   PPHAP is a mixture of polvalkylene glycol, poly(methylhydrosiloxane), (3-glycidyloxypropyl) trimethoxysilane, and platinum (0 )-1,3-divinyl-1,1,3,3-tetramethyl-disiloxane;
   PGPMH is a mixture of polyalkylene glycol, (3-glycidyloxypropyl)trimethoxysilane, Hydroxyl-terminated poly(dimethylsiloxane), acetic acid, and water; and
   PPA is a mixture of polyalkylene glycol, hydroxyl-terminated poly(dimethylsiloxane), and (3-aminopropyl -trimethoxysilane; and
   heating the coated carbon nanotube thread at a temperature from 50° C. to 230° C. to dry the coated carbon nanotube thread, the coated carbon nanotube thread having after drying a final coefficient of friction less than the initial coefficient of friction.

2. The method of claim 1, further comprising applying a lubricant to the coated carbon nanotube thread after the coated carbon nanotube thread is dry.

3. An article comprising a substrate stitched with a coated carbon nanotube thread in a Z-direction into the substrate, the coated carbon nanotube thread being prepared according to the method of claim 1.

4. A method for strengthening a composite, the method comprising:
stitching a coated carbon nanotube thread prepared according to the method of claim 1 with a sewing machine in a Z-direction into the composite.

5. The method of claim 4, further comprising before stitching the coated nanotube thread with the sewing machine:
heating the coated carbon nanotube thread at a temperature from 50° C. to 230° C.;
winding the coated carbon nanotube thread onto a spool; and
loading the spool into the sewing machine.

6. The method of claim 4, further comprising:
dripping or spraying a solvent onto the carbon nanotube thread while stitching the coated nanotube thread with the sewing machine.

7. The method of claim 6, wherein the solvent s selected from the group consisting of water, alcohols, and acetone.

8. The method of claim 4, further comprising:
lubricating the carbon nanotube thread with dry graphite while stitching the coated nanotube thread with the sewing machine.

9. The method of claim 5, further comprising:
dripping or spraying a solvent onto the carbon nanotube thread while stitching the coated nanotube thread with the sewing machine.

10. The method of claim 9, wherein the solvent is selected from the group consisting of water, alcohols, and acetone.

11. The method of claim 5, further comprising:
lubricating the carbon nanotube thread with dry graphite while stitching the coated nanotube thread with the sewing machine.

12. The method of claim 5, wherein, during the stitching, the coated carbon nanotube thread does not tangle, jam the sewing machine, or miss stitches.

13. The method of claim 4, wherein the coating solution is selected from the group consisting of DMF, DMS, AMSG, HPM, and PAWG.

14. The method of claim 4, wherein:
the coating solution is selected from the group consisting of AMSG, HPM, and PAWG; and
the coated carbon nanotube thread has a carbon-nanotube (CNT)/sizing interface comprising interface 1 and interface 2:

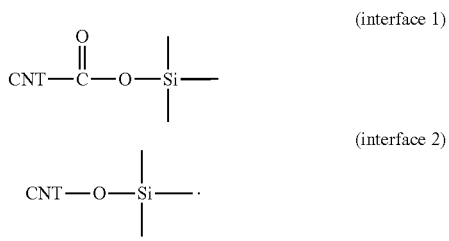

15. The method of claim 14, wherein the coating solution is PAWG.

16. The method of claim 1, wherein the coating solution is selected from the group consisting of DMF, DMS, AMSG, HPM, and PAWG.

17. The method of claim 1, wherein:
the coating solution is selected from the group consisting of AMSG, and PAWG; and
the coated carbon nanotube thread has a CNT/sizing interface comprising interface 1 and interface 2:

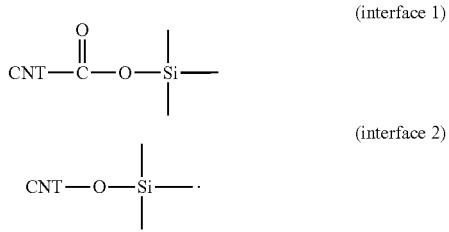

18. The method of claim 17, wherein the coating solution is PAWG.

19. The method of claim 2, wherein the lubricant is selected from the group consisting of siloxanes, polyalkylene glycols, and combinations thereof.

20. The article of claim 3, wherein the substrate is selected from the group consisting of composite preforms, prepreg plies, dry laminates, carbon-fiber cloths, fiberglass, epoxy matrix composites, polyimides, and ceramic matrix composites.

* * * * *